(12) United States Patent
Otani

(10) Patent No.: US 12,448,052 B2
(45) Date of Patent: Oct. 21, 2025

(54) VEHICLE FRONT STRUCTURE

(71) Applicant: HONDA MOTOR CO., LTD., Tokyo (JP)

(72) Inventor: Yui Otani, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 373 days.

(21) Appl. No.: 18/165,984

(22) Filed: Feb. 8, 2023

(65) Prior Publication Data

US 2023/0257024 A1    Aug. 17, 2023

(30) Foreign Application Priority Data

Feb. 15, 2022    (JP) ................................ 2022-020976

(51) Int. Cl.
*B62D 25/08* (2006.01)
*E05B 83/24* (2014.01)

(52) U.S. Cl.
CPC ............ *B62D 25/084* (2013.01); *E05B 83/24* (2013.01)

(58) Field of Classification Search
CPC ....... B62D 25/084; E05B 83/24; E05B 77/02; E05B 77/04
See application file for complete search history.

(56) References Cited

U.S. PATENT DOCUMENTS

| | | | | |
|---|---|---|---|---|
| 6,464,289 B2* | 10/2002 | Sigonneau | ........ | B29C 45/14786 296/203.02 |
| 6,715,573 B2* | 4/2004 | Emori | ............... | B29C 45/14065 296/203.02 |
| 6,729,424 B2* | 5/2004 | Joutaki | ................ | B62D 29/004 180/311 |
| 6,796,604 B2* | 9/2004 | Igura | .................... | B62D 29/001 296/203.02 |
| 7,182,545 B2* | 2/2007 | Riviere | ............. | B29C 45/14311 403/267 |
| 7,735,226 B2* | 6/2010 | Riviere | ............. | B29C 45/14311 296/29 |
| 7,845,714 B2* | 12/2010 | Fischer | ................ | B62D 29/001 296/203.02 |

(Continued)

FOREIGN PATENT DOCUMENTS

| | | |
|---|---|---|
| CN | 109760749 A | 5/2019 |
| CN | 112026934 A | 12/2020 |

(Continued)

OTHER PUBLICATIONS

Machine Translation of FR2945066, Apr. 18, 2025.*

(Continued)

*Primary Examiner* — Jason S Morrow
(74) *Attorney, Agent, or Firm* — Rankin, Hill & Clark LLP (57) ABSTRACT

The vehicle front structure includes a bulkhead made of resin and provided at a vehicle front, hood lock mechanisms provided to an upper member of the bulkhead, and bulkhead upper stays respectively connected to left and right end portions of the upper member. The vehicle front structure includes metal patches as metal patch members formed integrally with respective end portions, in the vehicle width direction, of the bulkhead. The hood lock mechanisms are fixed to the respective metal patches, and the metal patches are linked to the respective upper stays.

3 Claims, 8 Drawing Sheets

(56) References Cited

U.S. PATENT DOCUMENTS

| | | | | |
|---|---|---|---|---|
| 8,313,138 | B2* | 11/2012 | Guyomard | B62D 29/002 |
| | | | | 264/570 |
| 8,399,084 | B2* | 3/2013 | Grgac | B62D 29/043 |
| | | | | 428/57 |
| 10,011,306 | B2* | 7/2018 | Lanard | B62D 25/084 |
| 10,471,996 | B2* | 11/2019 | Velasco | B62D 25/085 |
| 2002/0060476 | A1 | 5/2002 | Cantineau et al. | |
| 2002/0160145 | A1* | 10/2002 | Bauhoff | B62D 29/004 |
| | | | | 428/458 |
| 2007/0139940 | A1* | 6/2007 | Jung | B62D 25/084 |
| | | | | 362/460 |
| 2010/0078149 | A1* | 4/2010 | Yoshimitsu | B62D 25/084 |
| | | | | 296/193.09 |
| 2011/0011661 | A1 | 1/2011 | Takahashi et al. | |
| 2011/0298244 | A1* | 12/2011 | Ballesteros | B29C 45/14344 |
| | | | | 264/241 |
| 2017/0313361 | A1 | 11/2017 | Watanabe et al. | |
| 2019/0143920 | A1 | 5/2019 | Nakamoto | |
| 2020/0385066 | A1 | 12/2020 | Hayakawa et al. | |
| 2023/0257023 | A1* | 8/2023 | Otani | B62D 25/08 |
| | | | | 296/193.09 |
| 2024/0123815 | A1* | 4/2024 | Pfingsten | B60K 11/08 |

FOREIGN PATENT DOCUMENTS

| | | | | |
|---|---|---|---|---|
| CN | 117302361 | A | * 12/2023 | |
| FR | 2945066 | A1 | * 11/2010 | E05B 83/24 |
| JP | 2006-44336 | A | 2/2006 | |
| JP | 2009-255893 | A | 11/2009 | |
| JP | 2014-121955 | A | 7/2014 | |
| JP | 2020-196368 | A | 12/2020 | |
| WO | 2021/235495 | A1 | 11/2021 | |

OTHER PUBLICATIONS

Machine Translation of CN117302361, Apr. 18, 2025.*
Japanese Office Action received in corresponding Japanese application No. 2022-020976 dated Aug. 8, 2023 with English translation (6 pages).
Chinese Office Action received in corresponding Chinese application No. 202211678471.9 dated Jun. 25, 2025 with English translation (12 pages).

* cited by examiner

VEHICLE FRONT STRUCTURE

BACKGROUND OF THE INVENTION

1. Field of the Invention

The present invention relates to a vehicle front structure related to hood lock mechanisms at a bulkhead made of resin.

2. Description of the Related Art

A bulkhead disposed at a front part of a vehicle to support a heat exchanger such as a radiator is connected to a pair of side members provided at the left and right sides of the vehicle. As one example of this structure, as described in Patent Literature 1, the bulkhead is connected to a pair of left and right side members linked to upper members disposed at the left and right sides of the vehicle and made of a fiber reinforced plastic (FRP) (carbon resin).

PRIOR ART DOCUMENT(S)

[Patent Literature(s)]
Patent Literature 1: JP2014-121955A

In a case of a bulkhead made of resin, when the bulkhead cracks due to a vehicle collision, the hood lock attached to the bulkhead may be unlocked or destroyed, causing the hood to open. To avoid such trouble, it is conceivable to attach a metal patch to the bulkhead for reinforcement. However, in order to keep the hood lock locked even if the bulkhead breaks, the metal patch needs to be extended to and connected to a metal component such as a vehicle body framework. In this case, many metal components are necessary to fix the hood to the center of the bulkhead with one point, which leads to a problem of increased weight and costs for the bulkhead in the vehicle front structure.

SUMMARY OF THE INVENTION

The present invention has been made in view of such circumstances and has an object to provide a vehicle front structure that enables reduced weight and cost for a bulkhead.

A vehicle front structure of the present invention to achieve the above object includes: a bulkhead made of resin and provided at a vehicle front; hood lock mechanisms provided to an upper member of the bulkhead; and bulkhead upper stays respectively connected to left and right end portions, in a vehicle width direction, of the upper member, in which the vehicle front structure includes metal patch members formed integrally with respective end portions, in the vehicle width direction, of the bulkhead, the hood lock mechanisms are fixed to the respective patch members, and the patch members are linked to the respective bulkhead upper stays.

The present invention can provide a vehicle front structure that enables reduced weight and cost for a bulkhead.

DETAILED DESCRIPTION OF THE EMBODIMENTS

Configuration of an Embodiment

An embodiment of the present invention is described in detail with reference to FIGS. 1 to 8. In the description, the same elements are denoted by the same reference numeral to omit repetitive descriptions. Also, in the drawings, "front-rear," "left-right," and "upper-lower" denoted by the arrows represent the front-rear direction of the automobile (not shown), the width direction of the automobile, and vertical upper-lower direction, respectively.

Figure 1:
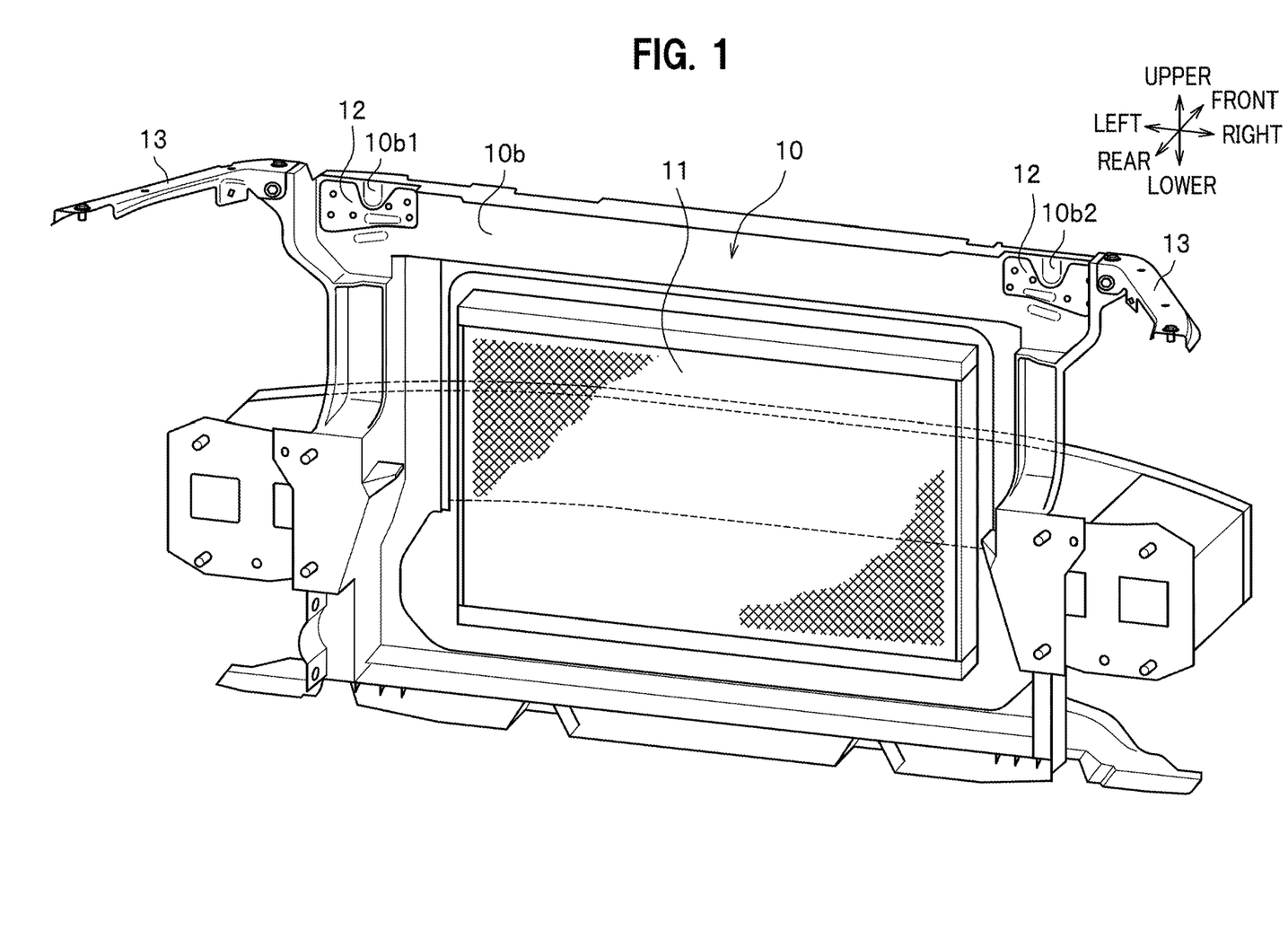
FIG. 1 is a perspective view showing the structure of the rear surface of a bulkhead disposed in a hood at a vehicle front part.

FIG. 1 is a perspective view showing the structure of the rear surface of a bulkhead disposed in a hood at a front part of the vehicle. A bulkhead 10 shown in FIG. 1 is made of resin, is disposed at the front side of the vehicle, forms a rectangular frame shape in a rear view (or in a front view), and supports a heat exchanger 11, such as a radiator, inside the rectangular frame. This bulkhead 10 is fixed to the front ends of a pair of left and right front side frames (not shown) of the vehicle.

In the bulkhead 10, metal hood lock fastening patches (also referred to as metal patches) 12 are fixed to a left end portion 10b1 and a right end portion 10b2 of an upper member 10b extending horizontally (laterally) in the vehicle width direction and are formed integrally with the upper member 10b. The metal patches 12 are formed integrally with the upper member 10b by insert molding.

Figure 2:
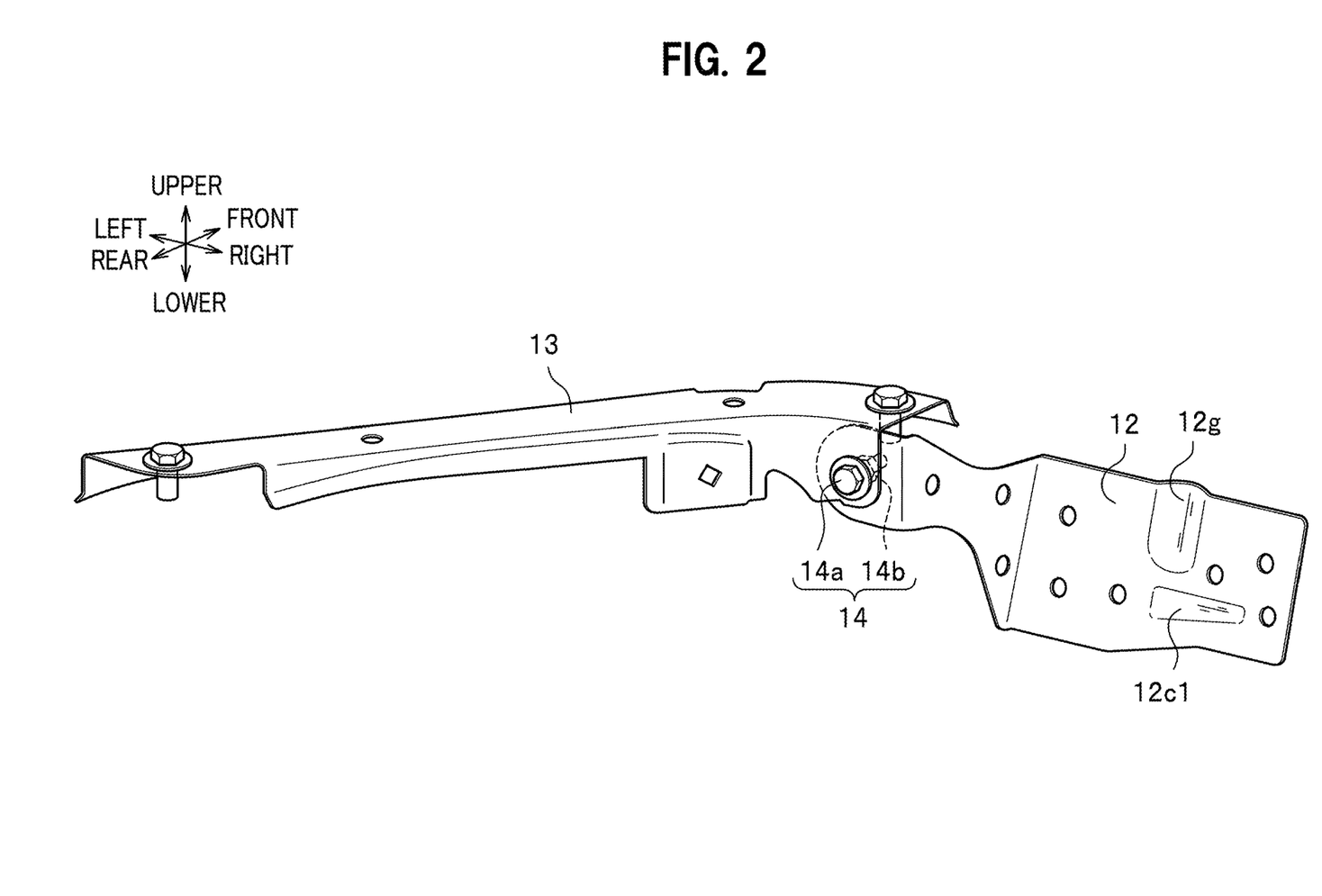
FIG. 2 is a perspective view showing how a metal patch and a bulkhead upper stay at the left side of the vehicle are connected.

As shown in FIG. 2 depicting the left metal patch 12 as a representative, a metal bulkhead upper stay (also referred to as an upper stay) 13 is fastened to a left end portion, in the vehicle width direction, of the metal patch 12. The upper stay 13 substantially has an inverted letter L shape in a cross sectional view. Similarly, another upper stay 13 is fastened to a right end portion of the right metal patch 12. The metal patch 12 and the upper stay 13 are brought into abutment in the vehicle front-rear direction and fastened with a bolt 14a and a nut 14b, and this fastening portion is referred to as a fastening portion 14. The left upper stay 13 has an angular letter C shape in cross section, extending leftward and outward in the vehicle width direction, and the outer end portion thereof is connected to a lower member (not shown) (the housing comp. side). The structure for the left upper stay 13 also applies to the right upper stay 13. Note that the metal patches 12 form the patch members described in the claims.

Figure 3:
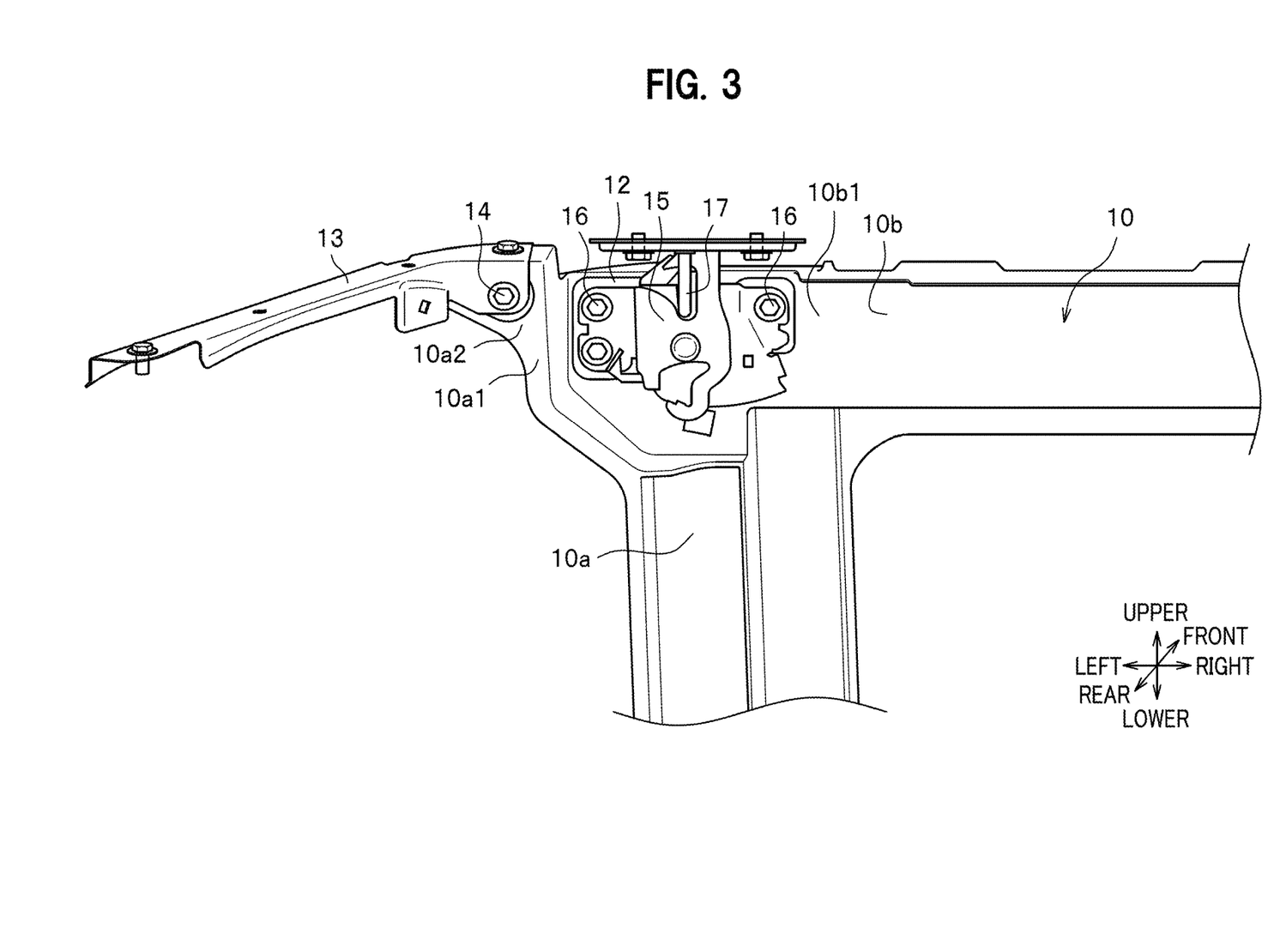
FIG. 3 is a rear view of an upper left side of the bulkhead.

As shown in FIG. 3 depicting the left side of the bulkhead as a representative, the bulkhead 10 has a column portion 10a extending longitudinally, and a rib portion 10a1 is provided at the left end side of the back surface of the column portion 10a, extending upward from a midpoint (see FIG. 1) of the column portion 10a. An upper portion of the rib portion 10a1 widens in a direction away from the vehicle, and this widened portion 10a2 covers a left side portion of the metal patch 12. The fastening portion 14 is provided at the widened portion 10a2. This widened portion 10a2 is included in the left end portion 10b1 of the upper member 10b.

As shown in FIG. 3, a hood lock mechanism 15 that locks a lock portion 17 of a hood (not shown) of the vehicle is fixed, with a plurality of sets of bolts 16 and nuts, to the metal patch 12 exposed from the bulkhead 10 shown in FIG. 1. This fixation is made on both of the left and right sides of the bulkhead 10, which means that the hood is locked by two left and right hood lock mechanisms 15.

Figure 4:
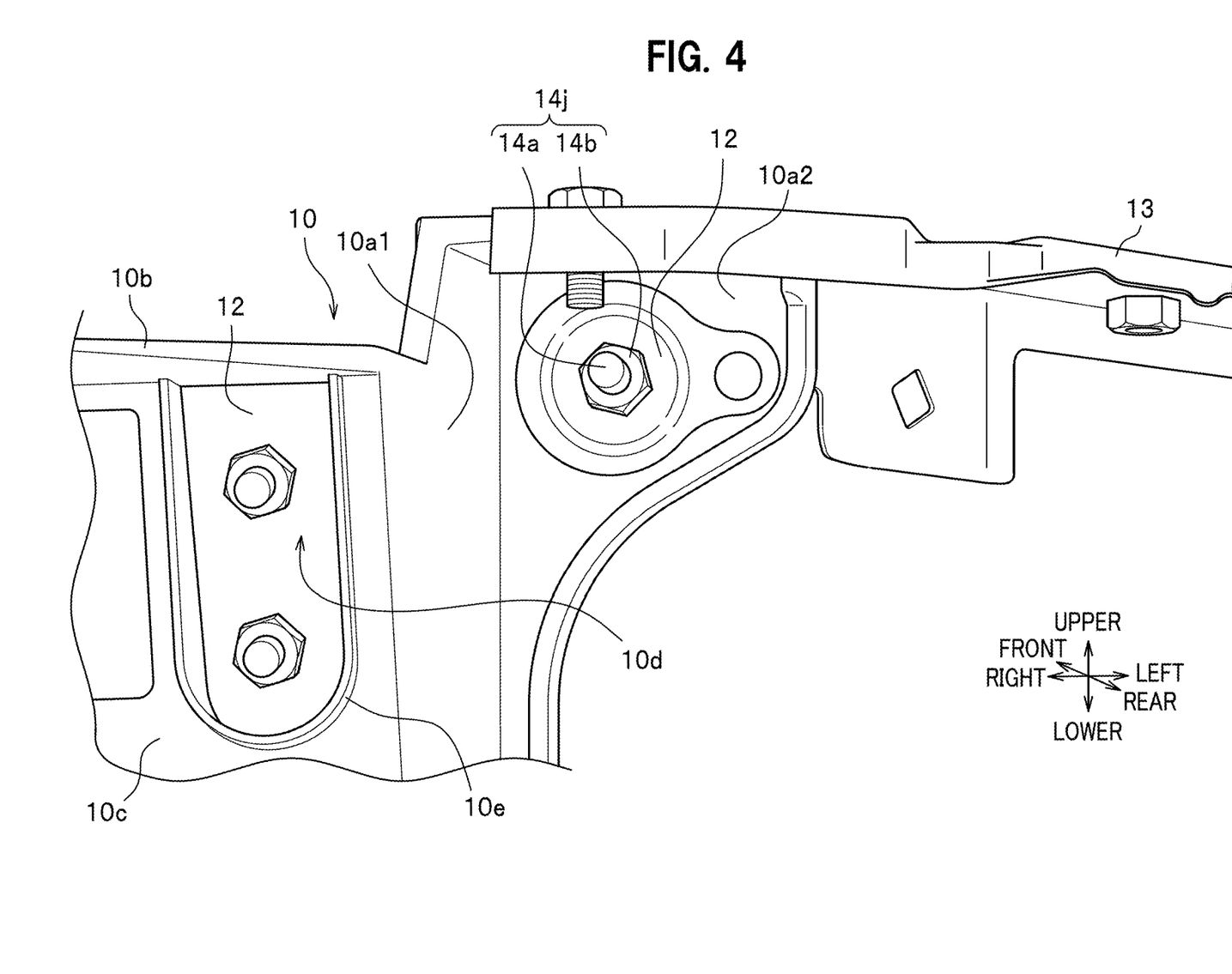
FIG. 4 is a perspective view showing the structure of how the metal patch and the bulkhead upper stay are fastened in a vehicle front-rear direction at the bulkhead.

FIG. 4 shows a vehicle front view of a fastening structure 14j for the metal patch 12 and the upper stay 13 at the left end side of the upper member 10b of the bulkhead 10. This fastening structure 14j is formed such that the rear surface (invisible in FIG. 4) of the metal patch 12 and the front surface (invisible in FIG. 4) of the upper stay 13 rearward of the metal patch 12 abut against each other in the vehicle front-rear direction and are fastened together by the bolt 14a and the nut 14b. More specifically, the fastening structure 14j is made by inserting the bolt 14a through through-holes (not shown) provided at predetermined positions in the metal patch 12 and the upper stay 13 at the front-rear abutment portion and fastening the bolt 14a with the nut 14b.

Because the rear surface of the metal patch 12 and the front surface of the upper stay 13 are brought into abutment in the vehicle front-rear direction and fastened in this fastening structure 14j, the fastening structure 14j has a long upper-lower dimension and a short front-rear dimension.

Figure 5:
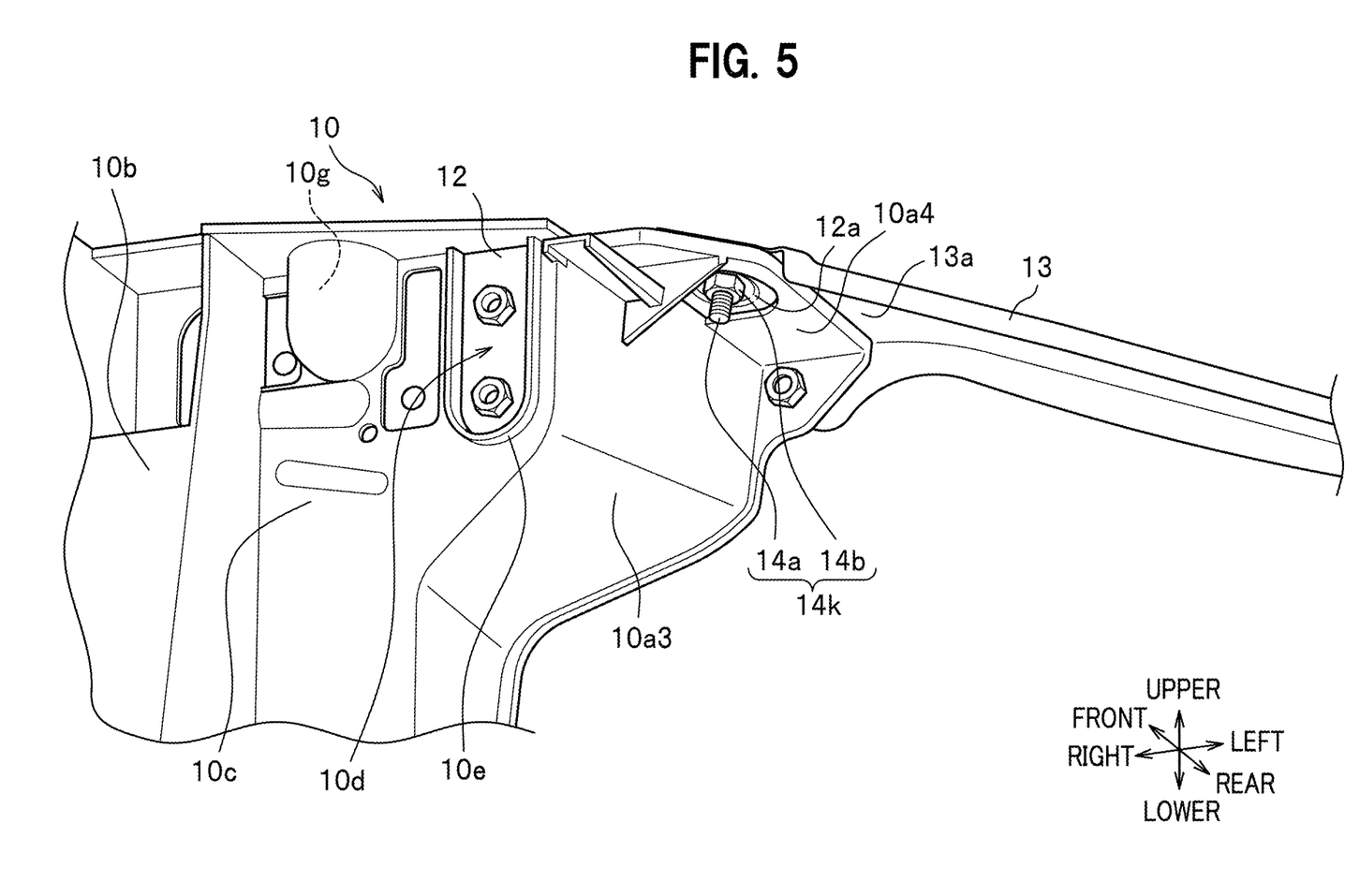
FIG. 5 is a perspective view showing the structure of how the metal patch and the bulkhead upper stay are fastened in a vehicle upper-lower direction at the bulkhead (a modification).

FIG. 5 shows a vehicle front view of a fastening structure 14k according to a modification of the metal patch 12 and the upper stay 13 at the left end side of the upper member 10b of the bulkhead 10. Note that the metal patch 12 has, at its left end side, a horizontal portion 12a facing in the upper-lower direction.

At the right end side of the bulkhead 10, a rib portion 10a3 forming a bracket for reinforcement is provided, extending longitudinally while curving. An upper portion of the rib portion 10a3 has a horizontal portion 10a4 bending from the longitudinal direction to the lateral direction (the horizontal direction) and extending in a direction away from the vehicle, and the horizontal portion 12a of the metal patch 12 is fixed to the horizontal portion 10a4 by integral molding. A part of the lower surface of the horizontal portion 12a of the metal patch 12 is exposed through a through-hole formed in the horizontal portion 10a4 of the bulkhead 10.

A horizontal portion 13a at the right end side of the upper stay 13 is placed on and abuts against this exposed portion of the horizontal portion 12a of the metal patch 12, and this abutment portion is fastened with the bolt 14a and the nut 14b, forming the fastening structure 14k. Note that through-holes (not shown) are provided at predetermined positions in the horizontal portion 12a of the metal patch 12 and the horizontal portion 13a of the upper stay 13 at the upper-lower abutment portion, and the bolt 14a is inserted through the through-holes and fastened with the nut 14b.

Because the upper surface of the metal patch 12 and the lower surface of the upper stay 13 are brought into abutment in the vehicle upper-lower direction and fastened in this fastening structure 14k, the fastening structure 14k has a short upper-lower dimension and a long front-rear dimension.

As shown in FIG. 4, in the bulkhead 10, a through-hole 10d is provided in a surface 10c (see FIG. 5) frontward of the resin bracket formed integrally with the metal patch 12. Through the through-hole 10d, the bolts and the nuts for fixing the lock mechanism 15 are exposed. A rib 10e for reinforcement is provided around the through-hole 10d. The through-hole 10d is opened in the form of the letter U, long in the upper-lower direction and curved at its lower side.

The rib 10e is raised perpendicularly from the surface 10c of the resin bracket, forming a letter U shape long in the vehicle upper-lower direction (the longitudinal direction). In other words, the rib 10e protrudes frontward in the shape of the letter U from the front surface of the resin bracket that is facing frontward of the vehicle. Because this letter U shape of the rib 10e surrounds the through-hole 10d where there is no resin, the rib 10e plays the role of enhancing the strength of the opening portion formed by the through-hole 10d.

Figure 6:
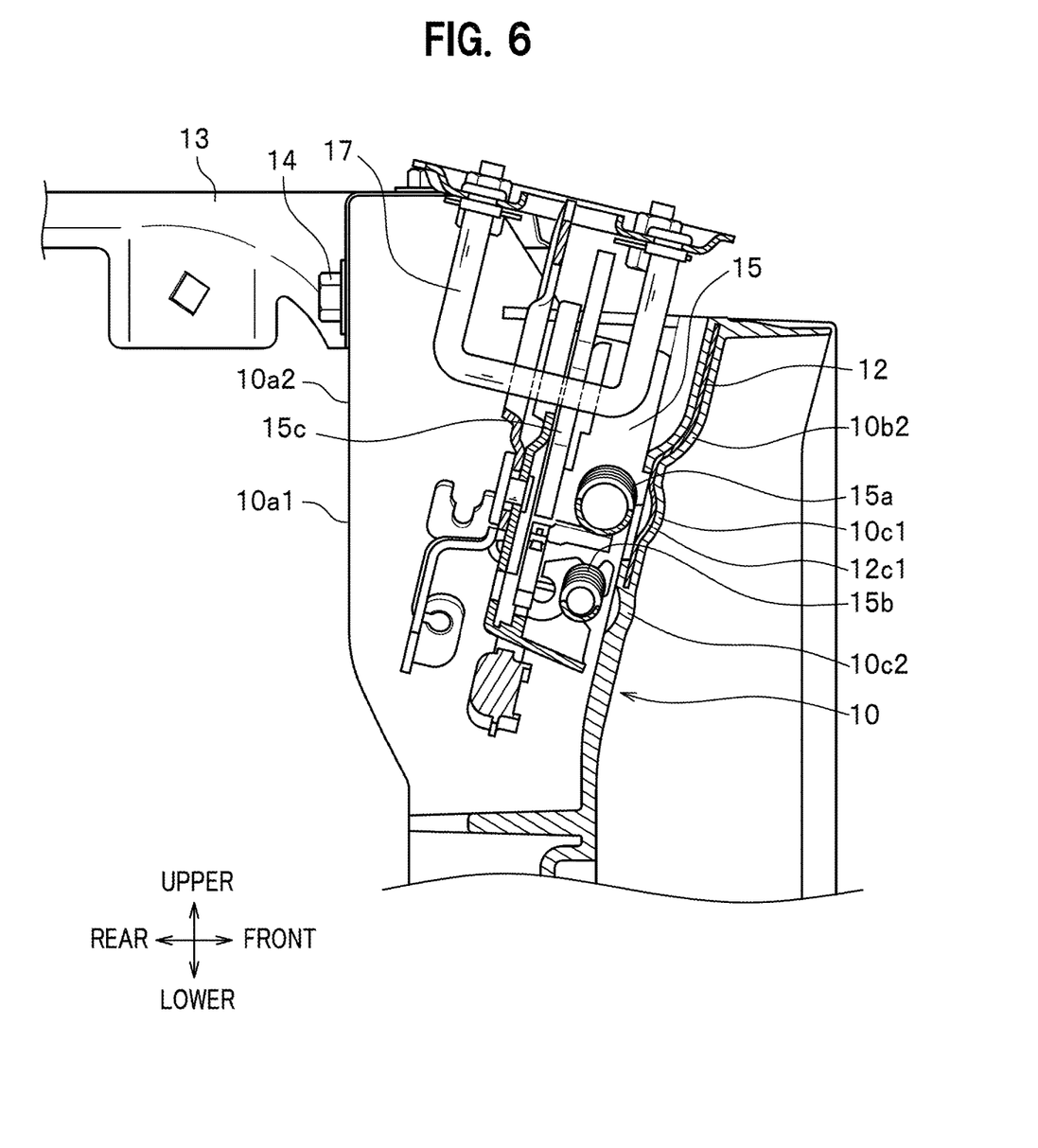
FIG. 6 is a sectional view showing a sectional configuration of the upper right side of the bulkhead.

As shown in the sectional view of the right side of the bulkhead shown in FIG. 6, the hood lock mechanism 15 disposed at the back side of the bulkhead 10 where the metal patch 12 is fixed includes two upper and lower spring movable portions 15a, 15b and a latch 15c. The lock portion 17 of the hood locked by the latch 15c forms a projecting frame shape protruding downward from the hood. The latch 15c is in a closed state when having the lock portion 17 of the hood in between and providing a lock and is in an open state when providing no lock. The spring movable portions 15a, 15b perform opening and closing operations when the springs extend and contract in response to opening and closing of the latch 15c.

Figure 7:
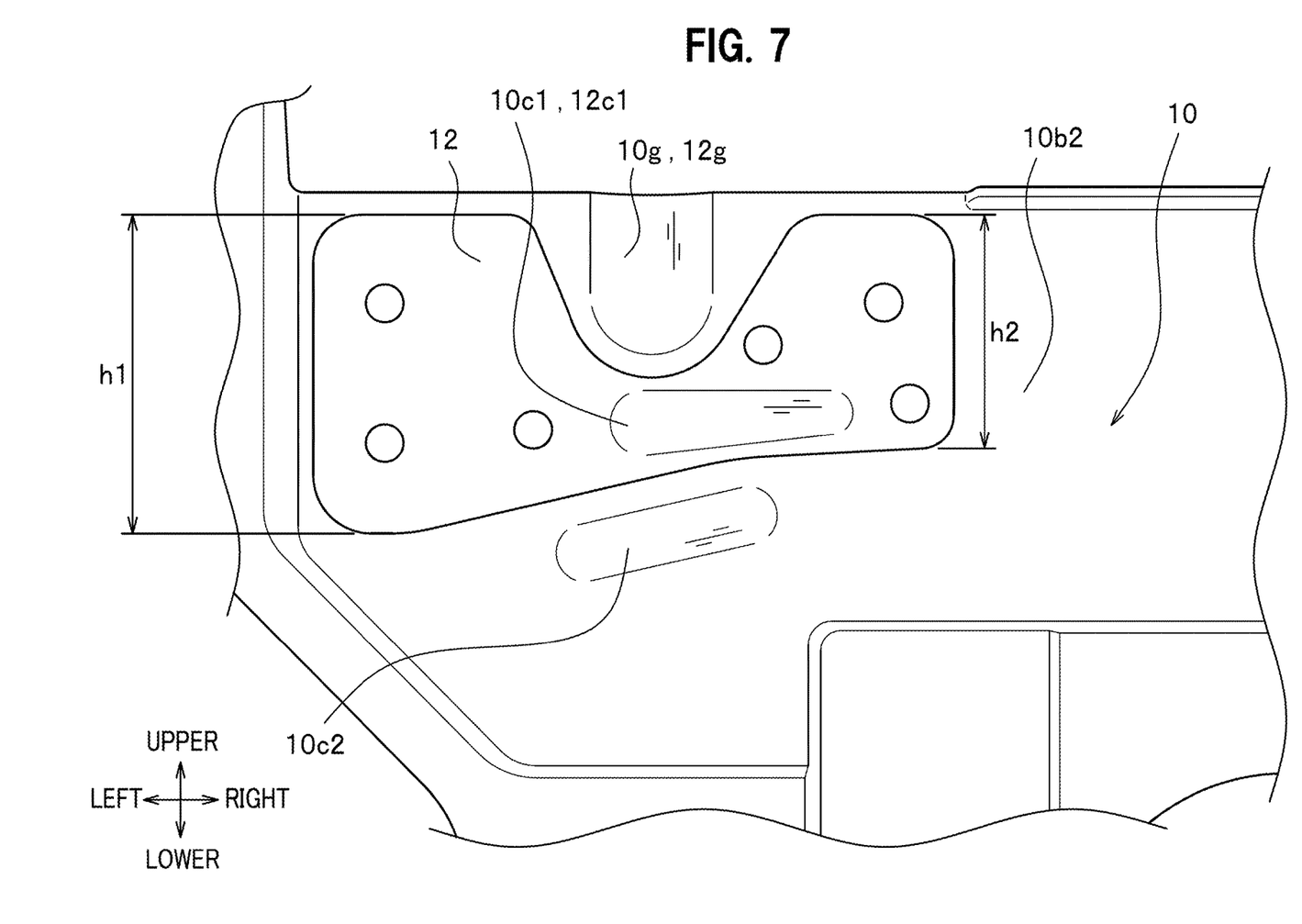
FIG. 7 is a rear view showing a recess portion in the metal patch on the bulkhead or in the bulkhead.

The upper spring movable portion 15a is located near the back surface of the metal patch 12 fixed to the right end portion 10b2 of the bulkhead 10. Recess portions 10c1, 12c1 (see FIG. 2) are respectively provided at positions in the bulkhead 10 and the metal patch 12 that face the position of the spring movable portion 15a, the recess portions 10c1, 12c1 being recessed in a direction opposite from the spring movable portion 15a. As shown in FIG. 7, the recess portions 10c1, 12c1 are bead-shaped. Being bead-shaped, the recess portion 12c1 of the metal patch 12 enhances rigidity. Further, because the recess portion 12c1 of the metal patch 12 is provided at a location downward of and a little rightward of recess portions 10g, 12g (see FIG. 2) where the striker of the bulkhead 10 enters, the strength of the right side of the metal patch 12 is increased. For this reason, rigidity can be ensured even though the height h2 of the right side of the metal patch 12 is lower than the height h1 of the left side of the metal patch 12.

The lower spring movable portion 15b shown in FIG. 6 is located near the back surface of the bulkhead 10, below the metal patch 12. At a position in the bulkhead 10 facing the position of the spring movable portion 15b, a recess portion 10c2 is provided, recessed in a direction opposite from the spring movable portion 15b. As shown in FIG. 7, the recess portion 10c2 is bead-shaped.

The recess portions 10c1, 10c2 thus provided allow the spring movable portions 15a, 15b to be closer to the front side without abutting against the side where there are the recess portions 10c1, 10c2. This consequently enables the hood lock mechanism 15 to be located more frontward in the vehicle. However, the spring movable portions 15a, 15b need to be away from the metal patch 12 or the bulkhead 10 by a predetermined length or more (e.g., 4 mm).

Even though the spring movable portions 15a, 15b are close to the side where there are the metal patch 12 and the bulkhead 10, the provision of the recess portions 10c1, 10c2 allows the springs not to touch the metal patch 12 and the bulkhead 10 when the springs change in position in the front-rear direction by extending and contracting in response to opening and closing of the latch 15c.

Note that the spring movable portions 15a, 15b are, in this example, members of the hood lock mechanism 15 that project frontward (frontward projecting members). However, if the hood lock mechanism 15 has any front projecting portion formed by a constituent other than the spring movable portions 15a, 15b that is not shown, recess portions which are recessed to the front side may be formed at positions in the bulkhead 10 and the metal patch 12 corresponding to this frontward projecting portion.

Figure 8:
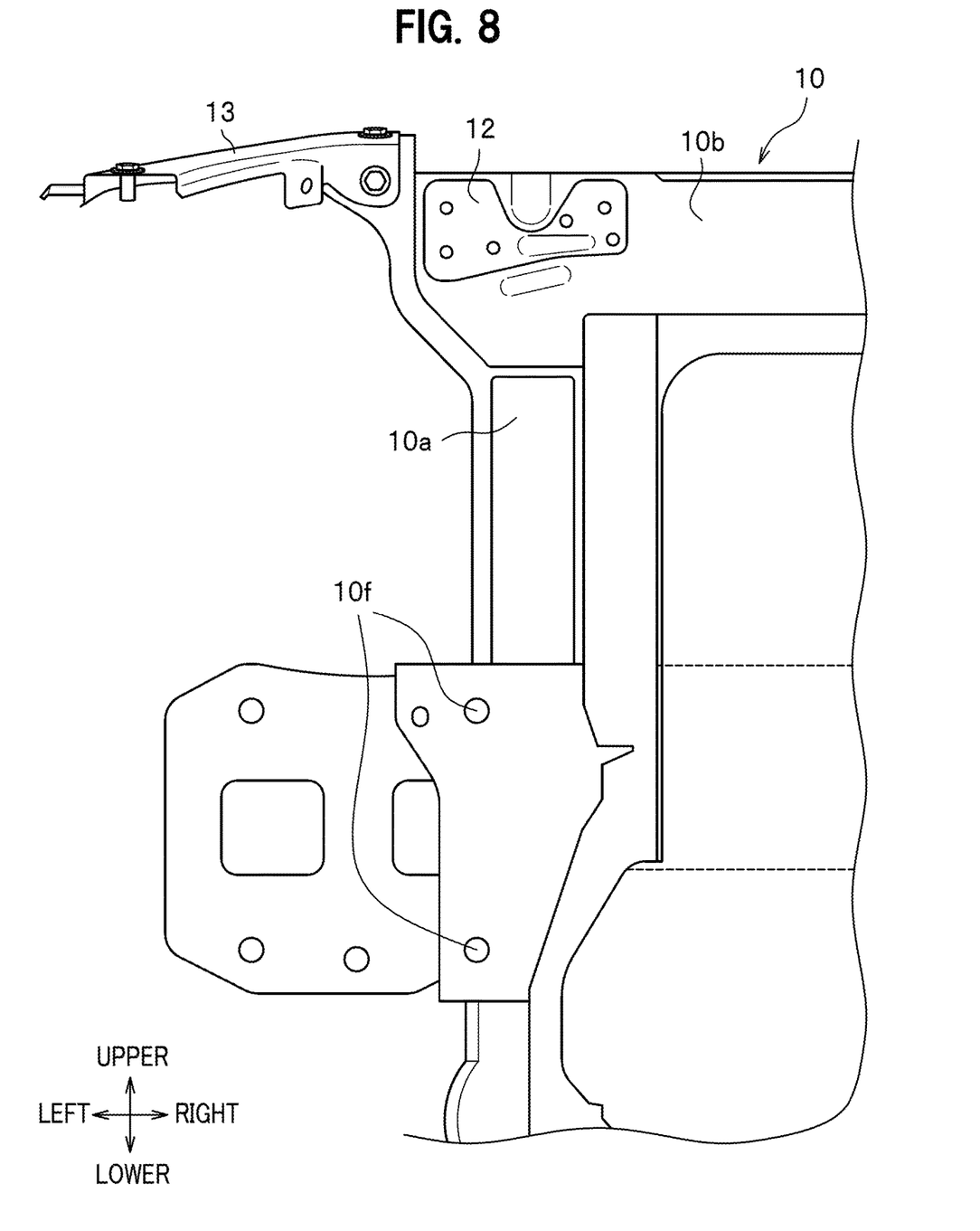
FIG. 8 is a rear view showing a column portion and vehicle body fixation portions of the bulkhead below the metal patch.

As shown in FIG. 8, vehicle body fixation portions 10f for fixing the bulkhead 10 to the vehicle body are provided below the hood lock mechanism 15, along the longitudinal direction (the upper-lower direction). These vehicle body fixation portions 10f are formed so that the bulkhead 10 may be fixed to the vehicle body by two screws arranged on a longitudinal line extending along the column portion 10a below the hood lock mechanism 15.

Advantageous Effects of the Embodiment

Next, the characteristic configuration of the vehicle front structure of the present embodiment described above and advantageous effects offered thereby are described.

(1) The vehicle front structure includes: the bulkhead 10 made of resin and provided at the vehicle front; the hood lock mechanisms provided to the upper member 10b of the bulkhead 10; and the bulkhead upper stays (upper stays) 13 respectively connected to left and right end portions, in the vehicle width direction, of the upper member. The vehicle front structure includes the metal patches 12 as metal patch members formed integrally with the respective end portions, in the vehicle width direction, of the bulkhead 10. The hood lock mechanisms 15 are fixed to the respective metal patches 12, and the metal patches 12 are linked to the respective upper stays 13.

According to this configuration, the metal patches 12 are formed integrally with and thereby fixed to the bulkhead 10 made of resin, and the hood lock mechanisms 15 are fixed to these fixed metal patches 12. Thus, the metal patches 12 reinforce the bulkhead 10, reducing cracking and breaking, which helps prevent the hood locks of the hood lock mechanisms 15 from being unlocked upon a vehicle collision even though the bulkhead 10 is made of resin.

Also, because the metal patches 12 are formed integrally with the bulkhead 10, fixation with bolts and nuts or the like is unnecessary. This enables reduction in the number of components and creation of space.

Further, the hood lock mechanisms 15 are fixed to the two metal patches 12 at the left and right end portions of the bulkhead 10, and the metal upper stays 13 fastened to these two metal patches 12 are located near the vehicle body frame. This enables connection to the vehicle body frame with short upper stays 13. Thus, this vehicle front structure requires fewer metal components (less amount of metal) compared to a conventional structure where the hood of the vehicle is fixed to the center of the bulkhead with one point, which enables weight and cost reduction for the bulkhead 10 of the vehicle front structure.

(2) The metal patches 12 and the upper stays 13 are brought into abutment in the vehicle front-rear direction and fastened (connected) to each other (the fastening structure 14j).

According to this configuration, the fastening structure 14j in the vehicle front part has a long upper-lower dimension (the dimension in the height direction) and a short front-rear dimension. Thus, the fastening structure 14j can be disposed efficiently in a type of vehicle with a high vehicle height, such as a sport utility vehicle (SUV).

(3) The metal patches 12 and the upper stays 13 are brought into abutment in the vehicle upper-lower direction and fastened (connected) to each other (the fastening structure 14k).

According to this configuration, the fastening structure 14k in the vehicle front part has a short upper-lower dimension (the dimension in the height direction) and along front-rear dimension. Thus, the fastening structure 14k can be disposed efficiently in a type of vehicle with a low vehicle height, such as a sedan.

(4) The bulkhead 10 is provided with the ribs 10e surrounding the through-holes 10d penetrating through the surfaces 10c where the metal patches 12 are integrally formed, the ribs 10e being raised from the surfaces 10c.

According to this configuration in which the through-holes 10d are provided in the surfaces 10c of the bulkhead 10 that have the metal patches 12, there is no resin in the through-holes 10d, enabling reduction in weight. Also, the provision of the ribs 10e around the through-holes 10d allows reduction in warpage of the bulkhead 10.

(5) At least one of the bulkhead 10 and each of the metal patches 12 is provided with a recess portion at a position corresponding to a frontward projecting portion of each of the hood lock mechanisms 15, the recess portion being recessed to the vehicle front side.

According to this configuration, the hood lock mechanisms 15 can be fixed at positions closer to the bulkhead 10, allowing more space to be created in the hood. Also, providing the recess portions 12c1 at the metal patches 12 increases rigidity, which allows the metal patches 12 to have a smaller height (upper-lower width). Thus, there are fewer metal components (less amount of metal), which enables weight and cost reduction for the bulkhead 10 of the vehicle front structure.

(6) At least one of the bulkhead 10 and each of the metal patches 12 is provided with the recess portions 10c1, 10c2 at positions corresponding to the spring movable portions 15a, 15b of the hood lock mechanisms 15, the recess portions 10c1, 10c2 being recessed to a vehicle front side.

According to this configuration, the hood lock mechanisms 15 can be fixed at positions closer to the bulkhead 10, allowing more space to be created in the hood. Also, providing the recess portions 12c1 at the metal patches 12 increases rigidity, which allows the metal patches 12 to have a minimum upper-lower width. Thus, there are fewer metal components (less amount of metal), which enables weight and cost reduction for the bulkhead 10 of the vehicle front structure.

(7) The vehicle front structure includes the vehicle body fixation portions 10f at a lower side, in a vehicle upper-lower direction, of each of the hood lock mechanisms 15 fixed to the bulkhead 10, the vehicle body fixation portions 10f being for fixing the bulkhead 10 to the vehicle body.

According to this configuration, load applied when the hood is opened and closed, or particularly applied downward from above when the hood is closed, is transmitted straight to the rigid vehicle body fixation portions 10f via the column portions 10a, which makes it less likely for the bulkhead 10 to break.

Although the vehicle body structure according to the present embodiment has thus been described, the present invention is not limited to this and can be appropriately modified without departing from the gist of the present invention.

What is claimed is:

1. A vehicle front structure comprising:

a bulkhead made of resin and provided at a vehicle front;

hood lock mechanisms provided to an upper member of the bulkhead; and bulkhead upper stays respectively connected to left and right end portions, in a vehicle width direction, of the upper member, wherein the vehicle front structure comprises metal patch members formed integrally with respective end portions, in the vehicle width direction, of the bulkhead, the hood lock mechanisms are fixed to the respective patch members, the patch members are linked to the respective bulkhead upper stays, and the bulkhead is provided with a rib around a through-hole penetrating through a surface where the patch member is integrally formed, the rib being raised from the surface.

2. A vehicle front structure comprising:

a bulkhead made of resin and provided at a vehicle front;

hood lock mechanisms provided to an upper member of the bulkhead; and bulkhead upper stays respectively connected to left and right end portions, in a vehicle width direction, of the upper member, wherein the vehicle front structure comprises metal patch members formed integrally with respective end portions, in the vehicle width direction, of the bulkhead, the hood lock mechanisms are fixed to the respective patch members, the patch members are linked to the respective bulkhead upper stays, and at least one of the bulkhead and each of the patch members is provided with a recess portion at a position corresponding to a frontward projecting portion of each of the hood lock mechanisms, the recess portion being recessed to a vehicle front side.

3. The vehicle front structure comprising:

a bulkhead made of resin and provided at a vehicle front;

hood lock mechanisms provided to an upper member of the bulkhead; and bulkhead upper stays respectively connected to left and right end portions, in a vehicle width direction, of the upper member, wherein the vehicle front structure comprises metal patch members formed integrally with respective end portions, in the vehicle width direction, of the bulkhead, the hood lock mechanisms are fixed to the respective patch members, the patch members are linked to the respective bulkhead upper stays, and at least one of the bulkhead and each of the patch members is provided with a recess portion at a position corresponding to a spring movable portion of each of the hood lock mechanisms, the recess portion being recessed to a vehicle front side.

* * * * *